United States Patent
Lin et al.

(10) Patent No.: US 11,954,521 B2
(45) Date of Patent: Apr. 9, 2024

(54) DEEP LEARNING JOB SCHEDULING METHOD AND SYSTEM AND RELATED DEVICE

(71) Applicant: Huawei Cloud Computing Technologies Co., Ltd., Guizhou (CN)

(72) Inventors: Jian Lin, Shenzhen (CN); Jie Yang, Hangzhou (CN); Sibao Hong, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 805 days.

(21) Appl. No.: 17/038,720

(22) Filed: Sep. 30, 2020

(65) Prior Publication Data

US 2021/0011762 A1    Jan. 14, 2021

Related U.S. Application Data

(63) Continuation of application No. PCT/CN2019/078533, filed on Mar. 18, 2019.

(30) Foreign Application Priority Data

Mar. 30, 2018  (CN) .......................... 201810276336.9
May 2, 2018  (CN) .......................... 201810414039.6

(51) Int. Cl.
  *G06F 9/48*    (2006.01)
  *G06F 9/50*    (2006.01)
  (Continued)

(52) U.S. Cl.
  CPC .......... *G06F 9/4881* (2013.01); *G06F 9/5083* (2013.01); *G06N 3/08* (2013.01); *G06N 20/00* (2019.01)

(58) Field of Classification Search
  CPC ..... G06F 9/4881; G06F 9/5083; G06N 20/00; G06N 3/08
  See application file for complete search history.

(56) References Cited

U.S. PATENT DOCUMENTS

2005/0275863 A1    12/2005  Ota
2009/0248473 A1    10/2009  Doenig et al.
(Continued)

FOREIGN PATENT DOCUMENTS

CN    103744734 A    4/2014
CN    104166590 A    11/2014
(Continued)

*Primary Examiner* — Wissam Rashid
(74) *Attorney, Agent, or Firm* — Conley Rose, P.C.

(57) ABSTRACT

A deep learning job scheduling method includes obtaining a job request of a deep learning job, determining a target job description file template from a plurality of pre-stored job description file templates based on the job request, determining an identifier of a target job basic image from identifiers of a plurality of pre-stored job basic images based on the job request, generating a target job description file based on the target job description file template and the identifier of the target job basic image, sending the target job description file to a container scheduler, and selecting the target job basic image from the pre-stored job base images based on the target job description file, and creating at least one container for executing the job request.

20 Claims, 12 Drawing Sheets

(51) Int. Cl.
*G06N 3/08* (2023.01)
*G06N 20/00* (2019.01)

(56) References Cited

U.S. PATENT DOCUMENTS

| | | |
|---|---|---|
| 2015/0256481 A1 | 9/2015 | Turovsky et al. |
| 2015/0379424 A1 | 12/2015 | Dirac et al. |
| 2016/0162320 A1 | 6/2016 | Singh et al. |
| 2018/0137093 A1* | 5/2018 | Goldfarb ............. G06F 3/04847 |
| 2018/0307509 A1* | 10/2018 | Dai ....................... G06F 9/5027 |
| 2019/0108049 A1 | 4/2019 | Singh et al. |
| 2021/0011762 A1 | 1/2021 | Lin et al. |

FOREIGN PATENT DOCUMENTS

| | | |
|---|---|---|
| CN | 107111519 A | 8/2017 |
| CN | 107193635 A | 9/2017 |
| CN | 107203424 A | 9/2017 |
| CN | 107480027 A | 12/2017 |
| CN | 107783816 A | 3/2018 |
| CN | 106027643 B | 10/2018 |
| CN | 108920259 A | 11/2018 |
| CN | 107450961 B | 10/2020 |
| IN | 107733977 A | 2/2018 |

\* cited by examiner

```
1    {%- set replicas = {"worker": worker_replicas, "ps": ps_replicas} -%}
2    {%- set port = 5000 -%}
3    {%- set layout = "dist" -%}
4
5    {%- macro worker_hosts() -%}
6      {%- for i in range(worker_replicas) -%}
7        {%- if not loop.first -%},{%- endif -%}
8        {{ name }}-worker-{{ i }}:{{ port }}
9      {%- endfor -%}
10   {%- endmacro -%}
11
12   {%- macro ps_hosts() -%}
13     {%- for i in range(ps_replicas) -%}
14       {%- if not loop.first -%},{%- endif -%}
15       {{ name }}-ps-{{ i }}:{{ port }}
16     {%- endfor -%}
17   {%- endmacro -%}
18
19   {%- for job in ["worker", "ps"] -%}
20   {%- for i in range(replicas[job]) -%}
21   ---
22   kind: Service
23   apiVersion: v1
24   metadata:
25     name: {{ name }}-{{ job }}-{{ i }}
26     labels:
27       name: {{ name }}
28   spec:
29     selector:
30       name: {{ name }}
31       job: {{ job }}
32       task: "{{ i }}"
33     ports:
34     - port: {{ port }}
35   ---
36   kind: Pod
37   apiVersion: v1
38   metadata:
39     name: {{ name }}-{{ type }}-{{ job }}-{{ i }}
40     labels:
41       name: {{ name }}
42       type: {{ type }}
43       job: {{ job }}
44       task: "{{ i }}"
45       layout: {{ layout }}
46       running_replicas: "{{ ps_replicas + succeed_replicas: "{{ worker_replicas }}"
47
48       engine: {{ engine_type }}
49   spec:
50     containers:
51     - name: tensorflow
52       image: {{ image }}
53       ports:
54       - containerPort: {{ port }}
55       resources:
56         limits:
57           cpu: {{ pod_cpu }}
58           memory: {{ pod_memory }}
59           {% if device_type == 'GPU' and job == 'ps' and gpu_ps_replicas %}
60           alpha.kubernetes.io/nvidia-gpu: {{ gpu_ps_replicas }}
61           {% endif %}
62           {% if device_type == 'GPU' and job == 'worker' and gpu_worker_replicas %}
63           alpha.kubernetes.io/nvidia-gpu: {{ gpu_worker_replicas }}
64           {% endif %}
65       command:
66       - "/bin/bash"
67       - "run_train.sh"
68       args:
69       - "{{ app_url }}"
70       - "{{ boot_file }}"
71       - "{{ log_url }}/{{ job }}-{{ i }}.log"
72       - "--task_index={{ i }}"
73       - "--job_name={{ job }}"
74       - "--worker_hosts={{ worker_hosts() }}"
75       - "--ps_hosts={{ ps_hosts() }}"
76       - "--data_url={{ data_url }}"
77     restartPolicy: Never
78   ---
79   {%- endfor -%}
80   {%- endfor -%}
```

FIG. 4

```
|-bin
|-etc
|-home
| +-mind
| +-run_train.sh
  |-lib
  |-lib64
  |-sbin
  |-usr
  | +-local
  |   _+-lib
  |     +-python2.7
  |       +-site-packages
  |         +-tensorflow
  +-var
```

FIG. 5

```
1    FROM deeplearningcloud/ubuntu_tf_base:16.04-latest
2
3    # Set proxy
4    ARG download
5    ARG username
6    ARG usergroup
7
8    RUN wget \
9    $download/deeplearningcloud/ubuntu-16.04/third_party/tensorflow-1.4.0/tensorflow-1.4.0-cp27-cp27mu-manylinux1_x86_64.whl && \
10   pip --no-cache-dir install tensorflow-1.4.0-cp27-cp27mu-manylinux1_x86_64.whl && \
11   cp -rpf scripts/run_config/tensorflow/train/run_train.sh /home/$username/
12
13   RUN chown -R $username$usergroup /home/$username/ && \
14   chmod +x /home/$username/*.sh
15
16   USER $username
17
18   WORKDIR /home/$username
```

FIG. 6

```
1   ---
2   kind: Service
3   apiVersion: v1
4   metadata:
5     name: test-job-worker-0
6     labels:
7       name: test-job
8   spec:
9     selector:
10      name: test-job
11      job: worker
12      task: "0"
13    ports:
14    - port: 5000
15  ---
16  kind: Pod
17  apiVersion: v1
18  metadata:
19    name: test-job-train-worker-0
20    labels:
21      name: test-job
22      type: train
23      job: worker
24      task: "0"
25      layout: dist
26      running_replicas: "3"
27      succeed_replicas: "2"
28      engine: TensorFlow
29  spec:
30    containers:
31    - name: tensorflow
32      image: deeplearningcloud/tensorflow-cp27-cpu:1.4.0-latest
33      ports:
34      - containerPort: 5000
35      resources:
36        limits:
37          cpu: 4
38          memory: 7.2Gi
39      command:
40      - "/bin/bash"
41      - "run_train.sh"
42      args:
43      - "/mnt/user/app-ERMEHM9N3P1EOKE2/mnist"
44      - "mnist/mnist_replica.py"
45      - "/mnt/user/log-20HWV9ARA6YRNSW7/worker-0.log"
46      - "--task_index=0"
47      - "--job_name=worker"
48      - "--worker_hosts=test-job-worker-0:5000,test-job-worker-1:5000"
49      - "--ps_hosts=test-job-ps-0:5000"
50      - "--data_url=s3://mnist-test-bucket/mnist_data"
51    restartPolicy: Never
52  ---
```

FIG. 7

DEEP LEARNING JOB SCHEDULING METHOD AND SYSTEM AND RELATED DEVICE

CROSS-REFERENCE TO RELATED APPLICATIONS

This application is a continuation of International Patent Application No. PCT/CN2019/078533, filed on Mar. 18, 2019, which claims priority to Chinese Patent Application No. 201810414039.6, filed on May 2, 2018 and Chinese Patent Application No. 201810276336.9, filed on Mar. 30, 2018. All of the aforementioned patent applications are hereby incorporated by reference in their entireties.

TECHNICAL FIELD

This application relates to the field of artificial intelligence, and in particular, to a deep learning job scheduling method and system, and a related device.

BACKGROUND

In recent years, deep learning technologies have been more widely used in various industries. Major public cloud service providers at home and abroad have launched deep learning cloud services. Such cloud services are an inevitable choice for an enterprise to lower requirements for using the technologies and reduce costs of software and hardware deployment. When providing a deep learning service, a cloud service provider needs to consider many indicators, such as costs, performance, resource utilization, reliability, scalability, and maintainability, and these indicators are largely determined based on performance of a scheduling system. This is because an on-demand and flexible cloud service needs to be implemented through intensive resource reuse. The scheduling system that aims to optimally match a job with a resource is exactly a component implementing this process.

A working mode of application software determines design of the scheduling system. In the fields of high-performance computing, cloud computing, and big data processing, common scheduler software can be roughly classified into two types (1) batch processing job scheduler, (2) service scheduler. Table 1 compares features of the two types of typical schedulers and their jobs.

TABLE 1

| | Feature comparison between the typical schedulers and their jobs | |
|---|---|---|
| | Batch processing job scheduler | Service scheduler |
| Typical scheduling systems | SLURM, Portable Batch System (PBS), Yet Another Resource Negotiator (YARN) | KUBERNETES, Swarm, Datacenter Operating System (DC/OS) |
| Scheduling objects | (Generally) A process | (Generally) A container |
| Typical application | High-performance computing (message passing interface (MPI)) and big data processing (MapReduce) | Web service and cloud microservice |
| Job composition features | Homogeneous (single program, multiple data (SPMD)) or heterogeneous (multiple program, multiple data (MPMD)) process group | Independent or collaborative service set |
| Job status features | Running and interaction of the process usually include a status. A plurality of processes can be distributed and support concurrent calculation. | Running and interaction of the service are stateless. A single service supports running of a plurality of copies. |
| | Batch processing job scheduler | Service scheduler |
| Job life cycle features | Fixed and limited life cycle | Round-the-clock and long-period service |
| Scheduling function requirements | Batch processing, queue, and directed acyclic graph (DAG) workflow | Auto scaling, service orchestration, and rolling upgrade |
| Reliability mechanisms | Checkpoint recovery | Multi-copy and service migration |

In the deep learning field, main application software used by a user is a deep learning library, and a typical instance of the deep learning library includes a TENSORFLOW, an MXNET, and the like. The user may use the deep learning library in a free way to develop various deep learning application scenarios. This enables the deep learning library to have rich working modes and diversify deep learning job types. FIG. 1 shows a classification method for deep learning jobs. It can be learned that a typical deep learning job includes a training job, an inference job, a commissioning job, a visualization job, and the like. The training job may be single-node or distributed, and there may be a plurality of distributed implementations. The inference job may be online or offline.

A working mode of the deep learning library is different from a working mode of a conventional batch processing job in a high-performance cluster and a working mode of a long-period service in a cloud environment. A general batch processing job scheduler and service scheduler cannot meet a scheduling requirement of the deep learning library. The differences are as follows (1) A deep learning training job and an offline inference job are similar to the conventional batch processing job. However, different deep learning libraries or different working modes have different job composition features and status features such that the deep learning training job and the offline inference job are not as simple and typical as an MPI or MapReduce job. For example, a TENSORFLOW-based planner/scheduler (PS)-worker distributed job includes two types of tasks a PS and a worker. The PS is a service process that continuously runs and responds to a random request. A life cycle of the worker is determined by user code and can be long or short. In contrast, an MXNET-based PS-worker distributed job generally includes tasks of three roles a scheduler, a server (equivalent to the PS), and a worker. The scheduler is responsible for metainformation exchange and life cycle management of the server and the worker, to ensure that a server task ends. These complex factors make it difficult for the batch processing job scheduler to schedule the deep learning job in a simple way. The user has to compile some adaptation scripts with low reusability.

(2) A deep learning commissioning job and an online inference job are similar to a conventional service. However, as application services submitted by the user, the deep learning commissioning job and the online inference job have relatively short life cycles, and are different from typical system services such as a web server and a database in terms of the scheduling requirement. For example, in a multi-tenant scenario, different users may submit a lot of commissioning and inference jobs in a short time period. These jobs need to be scheduled in a queue, and the queue may require advanced policies such as a priority policy. For a service scheduler, designed for a system service scenario with a relatively stable quantity and life cycle, that lacks batch processing abstraction and a batch processing mechanism, these special scheduling requirements cannot be implemented or need to be implemented through a complex external mechanism.

Neither of the two types of conventional schedulers can fully meet complex and diverse scheduling requirements of a plurality of deep learning libraries and a plurality of types of deep learning jobs. This is a major obstacle to providing a deep learning service in a public cloud. By simply using an original batch processing job scheduler or service scheduler, a dedicated scheduling policy of deep learning cannot be implemented, which compromises user experience and increases operation and maintenance complexity, and hardware resource utilization is potentially affected, which increases operation costs of the public cloud.

SUMMARY

Embodiments of this application provide a deep learning job scheduling method and system, and a related device, thereby improving compatibility of deep learning job scheduling.

According to a first aspect, a deep learning job scheduling method is provided, including obtaining a job request of a deep learning job, where the job request carries a deep learning library type and a job type, determining a target job description file template from a plurality of pre-stored job description file templates based on the deep learning library type and the job type, determining an identifier of a target job basic image from identifiers of a plurality of pre-stored job basic images based on the deep learning library type and the job type, generating a target job description file based on the target job description file template and the identifier of the target job basic image, sending the target job description file to a container scheduler, and selecting, by the container scheduler, the target job basic image from the pre-stored job basic images based on the target job description file, and creating at least one container for executing the job request.

With reference to the first aspect, when the deep learning job includes at least one task, the job request includes at least two implementations.

In a first implementation, the job request further includes at least one piece of the following information a job name, a deep learning program storage location, an application boot file, a dataset storage location, a type of the at least one task, a quantity of each type of task in the at least one task, a job command line parameter, and a resource requirement of each of the at least one task.

In a second implementation, the job request further includes at least one piece of the following information a job name, a deep learning program, an application boot file, a dataset storage location, a type of the at least one task, a quantity of each type of task in the at least one task, a job command line parameter, and a resource requirement of each of the at least one task.

In any one of the two implementations, the target job description file may be generated based on the job request, the target job description file template, and the identifier of the target job basic image. Specifically, the target job description file template may be filled with the information included in the job request and the identifier of the target job basic image, to obtain the target job description file.

With reference to the first aspect, the job basic images include at least the following two implementations.

In a first implementation, the job basic images include an image of a deep learning library and an image of a dependency library, and the job basic images do not include an image of the deep learning program.

In a second implementation, the job basic images include an image of a deep learning library, an image of a dependency library, and an image of the deep learning program.

The dependency library is a library required when the deep learning job is executed, and an instantiation of the deep learning program is the deep learning job.

With reference to the first aspect, the plurality of pre-stored job description file templates and the plurality of pre-stored job basic images may be generated at least in the following manner the plurality of pre-stored job description file templates are generated based on deep learning library types and job types, and each of the plurality of pre-stored job description file templates corresponds to one deep learning library type and one job type, and the plurality of pre-stored job basic images are generated based on the deep learning library types and the job types, and each of the plurality of pre-stored job basic images corresponds to one deep learning library type and one job type.

With reference to the first aspect, after the sending the target job description file to a container scheduler, the method further includes when the container scheduler fails in scheduling, storing, in a queue, a job identifier indicating the job request, where the job identifier includes at least one of the job request, the information included in the job request, the target job description file, a pointer, and a data structure, the pointer points to at least one of the job request, the information carried in the job request, and the target job description file, and the data structure points to at least one of the job request, the information carried in the job request, and the target job description file, determining that the container scheduler has a condition for resubmitting a job request, and extracting the job identifier from the queue, and resubmitting the job request to the container scheduler based on the job identifier.

With reference to the first aspect, the method further includes monitoring a status change of the at least one container created by the container scheduler, and obtaining a job status of the job request based on the status change of the at least one container.

With reference to the first aspect, the deep learning library type is a type of a computer function library designed for development of the deep learning program, and the job type includes at least one of a training job, an inference job, a commissioning job, and a visualization job.

With reference to the first aspect, each of the plurality of pre-stored job description file templates is used to define an organization structure of common information in a corresponding job description file. Each of the plurality of pre-stored job description file templates includes common information of a same type of deep learning job in a non-variable form and specific information of different types of deep learning jobs in a variable form.

With reference to the first aspect, the target job description file template complies with a specification of the container scheduler.

According to a second aspect, a deep learning job scheduling system is provided. The system includes a job scheduler and a container scheduler.

The job scheduler is configured to obtain a job request of a deep learning job. The job request carries a deep learning library type and a job type.

The job scheduler is configured to determine a target job description file template from a plurality of pre-stored job description file templates based on the deep learning library type and the job type, and determine an identifier of a target job basic image from identifiers of a plurality of pre-stored job basic images based on the deep learning library type and the job type.

The job scheduler is configured to generate a target job description file based on the target job description file template and the identifier of the target job basic image.

The job scheduler is configured to send the target job description file to the container scheduler.

The container scheduler is configured to select the target job basic image from the pre-stored job basic images based on the target job description file, and create at least one container for executing the job request.

With reference to the second aspect, when the deep learning job includes at least one task, the job request includes at least the following two implementations.

In a first implementation, the job request further includes at least one piece of the following information a job name, a deep learning program storage location, an application boot file, a dataset storage location, a type of the at least one task, a quantity of each type of task in the at least one task, a job command line parameter, and a resource requirement of each of the at least one task.

In a second implementation, the job request further includes at least one piece of the following information a job name, a deep learning program, an application boot file, a dataset storage location, a type of the at least one task, a quantity of each type of task in the at least one task, a job command line parameter, and a resource requirement of each of the at least one task.

In any one of the two implementations, the job scheduler is further configured to generate the target job description file based on the job request, the target job description file template, and the identifier of the target job basic image. Specifically, the job scheduler is configured to fill the target job description file template with the information included in the job request and the identifier of the target job basic image, to obtain the target job description file.

With reference to the second aspect, the job basic images include at least the following two possible implementations.

In a first implementation, the job basic images include an image of a deep learning library and an image of a dependency library, and the job basic images do not include an image of the deep learning program.

In a second implementation, the job basic images include an image of a deep learning library, an image of a dependency library, and an image of the deep learning program. The dependency library is a library required when the deep learning job is executed, and an instantiation of the deep learning program is the deep learning job.

With reference to the second aspect, the plurality of pre-stored job description file templates and the plurality of pre-stored job basic images may be generated at least in the following manner the plurality of pre-stored job description file templates are generated based on deep learning library types and job types, and each of the plurality of pre-stored job description file templates corresponds to one deep learning library type and one job type, and the plurality of pre-stored job basic images are generated based on the deep learning library types and the job types, and each of the plurality of pre-stored job basic images corresponds to one deep learning library type and one job type.

With reference to the second aspect, the container scheduler is further configured to when the container scheduler fails in scheduling, store, in a queue, a job identifier indicating the job request. The job identifier includes at least one of the job request, the information included in the job request, the target job description file, a pointer, and a data structure. The pointer points to at least one of the job request, the information carried in the job request, and the target job description file. The data structure points to at least one of the job request, the information carried in the job request, and the target job description file. The job scheduler is further configured to determine that the container scheduler has a condition for resubmitting a job request, and extract the job identifier from the queue and resubmit the job request to the container scheduler based on the job identifier.

With reference to the second aspect, the job scheduler is further configured to monitor a status change of the at least one container created by the container scheduler, and obtain a job status of the job request based on the status change of the at least one container.

With reference to the second aspect, the deep learning library type is a type of a computer function library designed for development of the deep learning program, and the job type includes at least one of a training job, an inference job, a commissioning job, and a visualization job.

With reference to the second aspect, each of the plurality of pre-stored job description file templates is used to define an organization structure of common information in a corresponding job description file. Each of the plurality of pre-stored job description file templates includes common information of a same type of deep learning job in a non-variable form and specific information of different types of deep learning jobs in a variable form.

With reference to the second aspect, the target job description file template complies with a specification of the container scheduler.

According to a third aspect, a cloud service cluster is provided, including at least one management node and at least one compute node. The at least one management node communicates with the at least one compute node through a communications network. The at least one management node is configured to perform the method according to any one of the implementations of the first aspect.

According to a fourth aspect, a computer-readable storage medium is provided, including an instruction. When the instruction runs on a deep learning job scheduling system, the deep learning job scheduling system is enabled to perform the method according to any one of the implementations of the first aspect.

According to a fifth aspect, a computer program product is provided. The computer program product includes a program instruction. When the computer program product is executed by a computer, the computer performs the method according to any one of the implementations of the first aspect.

In the foregoing technical solutions, different types of deep learning jobs may generate, based on different job description file templates and different job basic images, job description files that comply with the specification of the container scheduler such that the different types of deep learning jobs can be processed by the container scheduler. This improves compatibility of deep learning job scheduling.

BRIEF DESCRIPTION OF DRAWINGS

To describe the technical solutions in the embodiments of this application or in the background more clearly, the following briefly describes the accompanying drawings for describing the embodiments of this application or the background.

FIG. 4 is a schematic diagram of partial content of a job description file template according to an implementation of this application.

FIG. 5 is a schematic diagram of a directory structure of a job basic image according to an implementation of this application.

FIG. 6 is a schematic diagram of a Dockerfile segment used by a job basic image according to an implementation of this application.

FIG. 7 is a schematic diagram of partial content of a job description file according to an implementation of this application.

DESCRIPTION OF EMBODIMENTS

For ease of understanding, deep learning, a deep learning program, a deep learning library, and a deep learning job are first described separately.

The deep learning is a machine learning technology based on a deep neural network algorithm, and is mainly applied to scenarios such as perception and decision-making in the artificial intelligence field, for example, image and speech recognition, natural language translation, and computer game. The deep learning program is software, developed by a user, that is about a deep learning computing service. In a running process of the deep learning program, the deep learning library usually needs to be called. The deep learning library is a computer function library designed for development of the deep learning program, and is a computer program file including elements such as a data structure, an algorithm, a model, a subprogram, and a constant that are commonly used in the deep learning program, or a set of computer program files. In other words, the deep learning library is application software encapsulated with a bottom-layer operation of the deep learning job. Therefore, when developing deep learning programs for various deep learning application scenarios using the deep learning library, the user may focus on content related to the deep learning application scenarios, and does not need to pay too much attention to content of the bottom-layer operation. This greatly improves development efficiency. The deep learning library may include a TENSORFLOW, an MXNET, and the like. It should be understood that the foregoing examples are merely used for description, and should not constitute a specific limitation. An instantiation of the deep learning program is the deep learning job. A computing service mainly applicable to a deep learning application scenario includes training, inference, commissioning, visualization, and the like. Therefore, a job type of the deep learning job mainly includes a training job, an inference job, a commissioning job, a visualization job, and the like. The training job may be single-node or distributed, and there may be a plurality of manners to implement a distributed training job.

The inference job may be online or offline. It may be understood that the foregoing examples of the job type are merely used for description, and should not constitute a specific limitation.

To better understand the embodiments of the present disclosure, the following first separately describes a deep learning job scheduling system in other approaches and then describes a deep learning job scheduling system in this application such that a reader can understand a difference and a relationship between the two systems.

Figure 1:
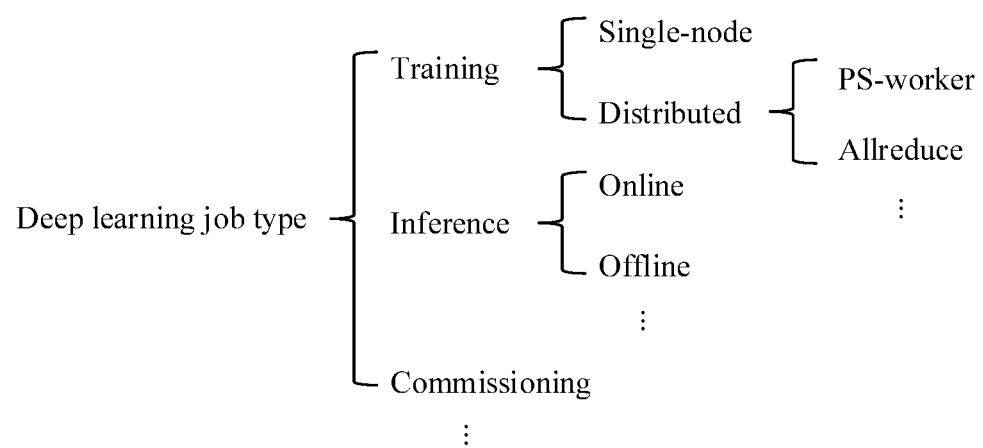
FIG. 1 is a schematic diagram of a type of a deep learning job according to an implementation of this application.
Figure 2:
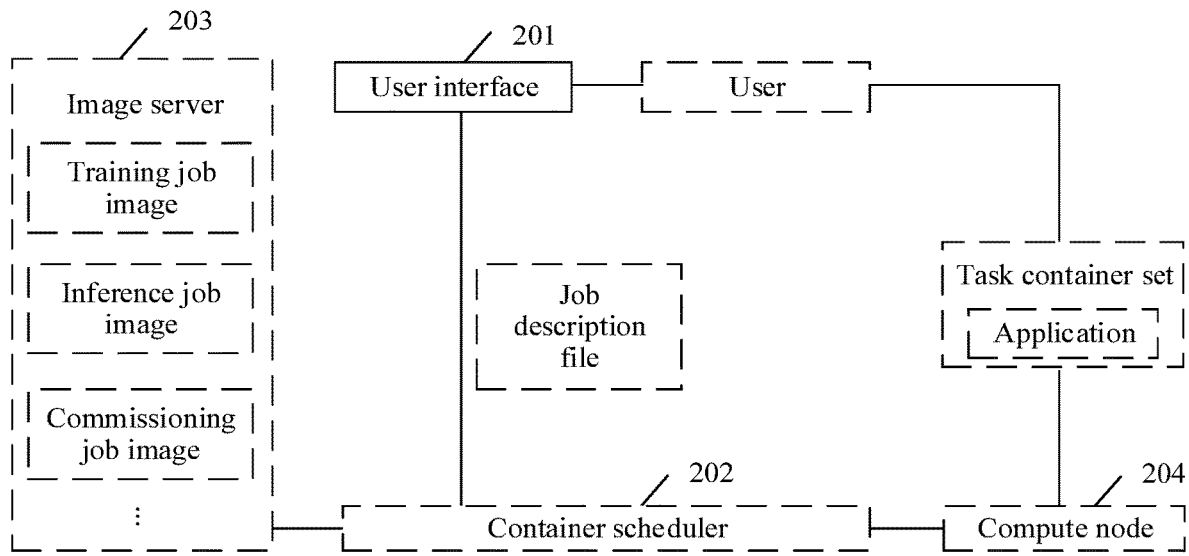
FIG. 2 is a schematic diagram of a deep learning job scheduling system.

Refer to FIG. 2. FIG. 2 is a schematic diagram of a deep learning job scheduling system. A user submits a job request to a container scheduler 202 through a user interface 201. Correspondingly, the container scheduler 202 receives the job request sent by the user through the user interface 201. The job request includes a job description file. After obtaining the job description file, the container scheduler 202 performs scheduling based on the job description file. When the container scheduler 202 succeeds in scheduling, the container scheduler 202 requests, from an image server 203 based on the job description file, a job image of which a type corresponds to a type of the job description file. The type of the job image includes a training job image, an inference image, a commissioning image, and the like. The job image includes a deep learning library, a dependency library, a deep learning program, and the like. Correspondingly, the image server 203 sends the job image corresponding to the job description file to the container scheduler 202. The container scheduler 202 creates at least one container (namely, a task container set) on a compute node 204 to execute, based on the job image, a deep learning job corresponding to the job request.

Figure 3:
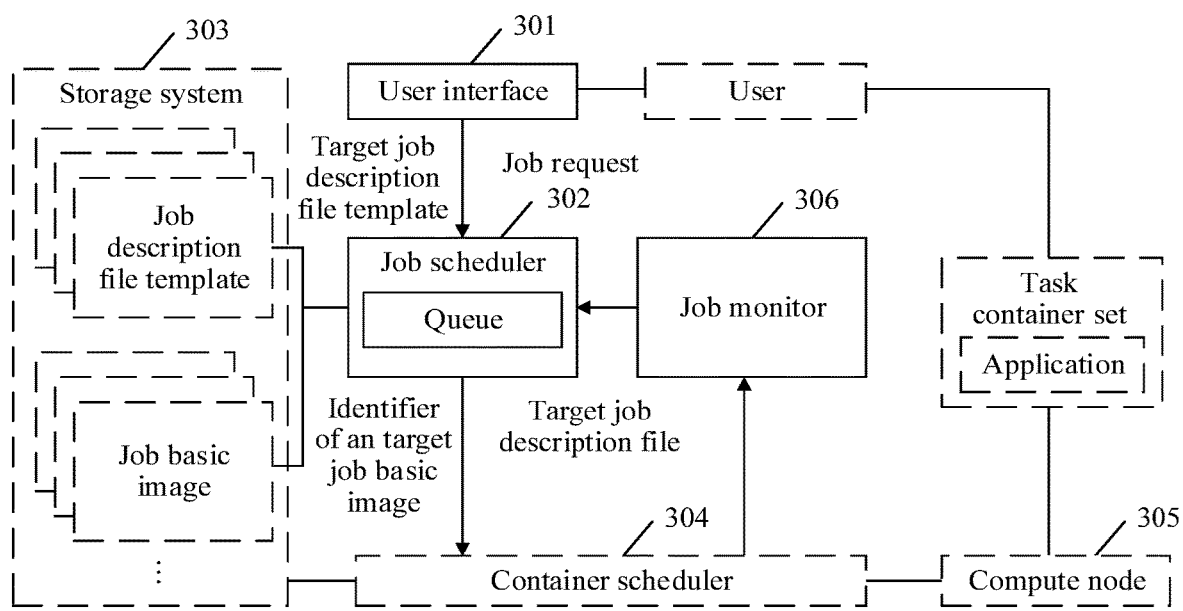
FIG. 3 is a schematic diagram of a deep learning job scheduling system according to an implementation of this application.

Refer to FIG. 3. FIG. 3 is a schematic diagram of a deep learning job scheduling system according to an embodiment of this application. A user submits a job request to a job scheduler 302 through a user interface 301. The job request carries a deep learning library type and a job type. The job scheduler 302 determines a target job description file template from a plurality of pre-stored job description file templates in a storage system 303 based on the deep learning library type and the job type. The job scheduler 302 determines an identifier of a target job basic image from identifiers of a plurality of pre-stored job basic images in the storage system 303 based on the deep learning library type and the job type. The job scheduler 302 generates a target job description file based on the target job description file template and the identifier of the target job basic image. The job scheduler 302 sends the target job description file to a container scheduler 304. The container scheduler 304 selects the target job basic image from the plurality of pre-stored job basic images in the storage system 303 based on the target job description file, and creates at least one container (namely, a task container set) on a compute node 305 for executing the job request. In addition, the deep learning job scheduling system further includes a job monitor 306 configured to monitor a status change of the at least one container created by the container scheduler 304, and obtain a job status of the job request based on the status change of the at least one container.

Compared with the deep learning job scheduling system shown in FIG. 2, the deep learning job scheduling system shown in FIG. 3 has at least the following improvements (1) A job scheduler is added to the deep learning job scheduling system shown in FIG. 3. The job scheduler generates a job description file based on a job description file template and a job basic image. Compared with the deep learning job scheduling system shown in FIG. 2, the job scheduler uniformly abstracts and encapsulates a plurality of deep learning libraries and a plurality of job types based on the job description file template and the job basic image such that the container scheduler can uniformly manage various deep learning jobs.

(2) A queue is introduced in the job scheduler of the deep learning job scheduling system shown in FIG. 3 such that the job request can be added to the queue when the job scheduler fails. To be specific, the deep learning job scheduling system shown in FIG. 2 constructs a batch job scheduling behavior on the container scheduler, to adapt to a deep learning job that can be processed in batches.

(3) The deep learning job scheduling system shown in FIG. 3 shields differences in deep learning library technologies of the bottom-layer container scheduler such that the container scheduler is capable of managing deep learning libraries with different features and free usage.

In a specific embodiment of this application, the job description file complies with a specification of the container scheduler and is a file used to express the job request. One job description file corresponds to one deep learning job. Different container schedulers may have different requirements for a format of the job description file.

In a specific embodiment of this application, the job description file is generated through rendering based on the job request, the job description file template, and a job basic image name.

In a specific embodiment of this application, the job request includes the deep learning library type and the job type. In addition, when the deep learning job includes at least one task, the job request includes at least the following two possible implementations.

In a first implementation, the job request further includes at least one piece of the following information a job name, a deep learning program storage location, an application boot file, a dataset storage location, a type of the at least one task, a quantity of each type of task in the at least one task, a job command line parameter, and a resource requirement of each of the at least one task.

In a second implementation, the job request further includes at least one piece of the following information a job name, a deep learning program, an application boot file, a dataset storage location, a type of the at least one task, a quantity of each type of task in the at least one task, a job command line parameter, and a resource requirement of each of the at least one task.

The job name is an identifier of the deep learning job. The deep learning program storage location is used by a compute node to read the deep learning program based on a storage location of an application. The deep learning program is software, developed by a user, that is about a deep learning computing service. The application boot file is a file required for starting the deep learning program. The dataset storage location is used by the compute node to read a dataset based on a storage location of the dataset when the deep learning job is executed. The dataset is a set of data required when the deep learning job is executed, for example, historical data used for training a data model when a training job is executed. The type of the at least one task, the quantity of each type of task in the at least one task, and the resource requirement of each of the at least one task are used by the container scheduler to determine a quantity of containers and a resource that needs to be occupied by each container during scheduling.

In a specific embodiment, in the job request, the job name (job_name), the application storage location (app_url and boot_file), and the dataset storage location (data_url) are string fields, the deep learning library type (engine_type) and the job type (job_type) are enumerated fields, the type of the at least one task, the quantity of each type of task in the at least one task, and the resource requirement (attribute_description) of each of the at least one task are key-value pair fields.

In a specific embodiment of this application, the job description file template is a template file used to define an organization structure of common information in the job description file. The job description file template compiles common information of a same type of deep learning job into the template in a non-variable form, and specific information of different types of deep learning jobs is displayed in the template in a variable form. The job description file template may be compiled in a dedicated programming language, for example, a Jinja programming language, or may be a simple text file with a replaceable field. This is not specifically limited herein. FIG. 4 shows an example of the job description file template, which is a segment of a job description file template for TENSORFLOW distributed training.

In a specific embodiment of this application, the job basic image name is an identifier of the job basic image. Generally, an image is a file set used to create a container runtime file system. An image file set includes an executable file, a library file, and a configuration file of an operating system, an executable file, a library file, and a configuration file of an application, and a necessary script file and data file. For the deep learning job, the image includes a deep learning application, the deep learning library, and another necessary dependency library. The deep learning application is uploaded by the user and may be different for each job. The deep learning library and the other dependency library are provided by a deep learning service provider and are the same for each job. The job basic image includes at least two possible implementations. In a first implementation, the job basic image includes an image of the deep learning library image and an image of the dependency library, and the job basic image does not include an image of the deep learning program. In a second implementation, the job basic image includes an image of the deep learning library, an image of the dependency library, and an image of the deep learning program.

In a specific embodiment, the job basic image includes the executable file, the library file, the configuration file of the operating system, the deep learning library, a job boot script, and the like. As shown in FIG. 5, a TENSORFLOW training job is used as an example, and a directory structure of a job basic image of the TENSORFLOW training job is provided. bin and sbin directories store an executable file of a LINUX OS. lib and lib64 directories store a library file of the LINUX OS. The etc and var directories store a configuration file of the LINUX OS. usr/local/lib/python2.7/site-package/TENSORFLOW directory stores a deep learning library—TENSORFLOW. A home/mind/run_train.sh file is the job boot script. More specifically, FIG. 6 shows a segment of a Dockerfile used to generate a TENSORFLOW job basic image. Line 1 of the Dockerfile indicates that the job basic image is created based on an image of a UBUNTU LINUX OS, to obtain a related file of the operating system. Line 8 to line 10 indicate that TENSORFLOW is downloaded and installed. Line 11 indicates that the job boot script is replicated. In this way, the job basic image includes all necessary files.

It may be understood that different container technical solutions have different image formats. In the Docker container technical solution used in this embodiment of the present disclosure, an image is stored in a format of a stacked file system. When creating an image for Docker, the user needs to use a text file named Dockerfile to describe steps for creating the image. Based on the steps, a Docker service program creates a file system structure of the image and stores the file system structure to a local file system. The Dockerfile may be viewed to roughly understand file content included in the image.

In a specific embodiment of this application, the job description file template is similar to a blank table. Information carried in the job request and the job basic image name may be filled in the job description file template in a rendering manner, to obtain a complete table. The job description file is this complete table. More specifically, The job description file template is like a blank table with only a field name preprinted but no specific information filled. A Jinja language is used as an example. In the job description file template, the field name and a placeholder of a field value are usually used to indicate a field. In the Jinja language, the field name is a string ended with a colon (for example, "name"), and is equivalent to the field name preprinted in the table, the placeholder of the field value is a string enclosed by two braces (for example, "{{name}}"), and is equivalent to a blank square in the table. For example, line 42 in FIG. 4 indicates that the job description file needs a field named "type". This field indicates a "job type", and a placeholder of the field is "{{type}}". When the job description file is generated, the placeholder is replaced by a real job type string. If the job description file corresponds to a table, this line is equivalent to a pair of squares such as "|Job type|         |" in the table.

The job description file is like a table filled with specific information. Based on the job description file template, the job description file uses a real metainformation field of a specific job instance to replace the placeholder in the job description file template. For example, line 22 in FIG. 7 indicates that a value of a "type" field of the specific job instance is "train". In other words, the job type is "train (train)". If the job description file template corresponds to a filled table, this line is equivalent to a square, filled with "|Job type|train (train)|", in the table corresponding to the job description file template. The real metainformation field has two sources (1) the job request and the job basic image name, (2) information automatically generated by the job scheduler.

Two sources of job metainformation are briefly described as follows (1) The job request and the basic job image name This metainformation is closely related to a service logic of a job instance and indicates an intention and expectation of the user to use a deep learning service. Typical metainformation includes the job name (name), the quantity of each type of task (ps_replicas and worker_replicas), the application storage location (app_url), the application boot file (boot_file), the dataset storage location (data_url), and the job basic image name (image).

(2) The metainformation automatically generated by the job scheduler. This metainformation is related to system background configuration of a cloud service environment. This metainformation is necessary for the container scheduler to create and schedule a container, but is not closely related to a service logic of a specific job instance. Because the user does not know system configuration of the cloud service environment, the metainformation must be automatically generated by the job scheduler. This may simplify a process of using a job scheduling system by the user, and improve usability of the job scheduling system. Typical metainformation includes a storage location (image) of the job basic image, and a host name and a port list (ps_hosts and worker_hosts) of each task.

In a specific embodiment of this application, a basic principle of rendering is to replace a variable with a real value. For example, in the Jinja language, rendering is to replace a placeholder of a field value of a corresponding field name with a real metainformation field. To improve rendering efficiency, in addition to the two semantics equivalent to traditional tables the field name and the placeholder of the field value, the Jinja language provides some programming statements. These statements are included in a string like {%- . . . -%}, and provide basic functions of a programming language such as variable, judgment, and loop, and can provide a plurality of programmable and automated capabilities for text processing of a template file. These statements are equivalent to a secretary who can handle many complex issues for the user in a table filling process. For example, some fields in a template need to repeat for a plurality of times, and an organization structure is the same each time, but field values filled in are different. In this case, a loop statement {%- for . . . in . . . -%} may be used to simplify template compilation. In this embodiment of this application, a job description file needs to provide metainformation of a plurality of containers, and the containers have a same organization structure but different specific field values. Therefore, a loop statement is used in the job description file template to process this case.

In a specific embodiment of this application, a job description file defines an organization structure of common information of a type of deep learning job. A job basic image includes a file system required for running a container of a type of deep learning job. Therefore, a deep learning job corresponds to a job description file and a job basic image. In other words, a deep learning job may be defined through a corresponding job description file and job basic image. A type of job refers to a specific type of job using a specific deep learning library. For example, a distributed training job using a TENSORFLOW library is a type of job. An online inference job using an MXNET library is another type of job. Theoretically, if the deep learning job scheduling system wants to support a quantity of combinations of a deep learning library type and a job type, the same quantity of job description files need to be created in this step. In other words, a quantity of job description file templates may be a product of a quantity of deep learning library types and a quantity of job types. For example, the training job using the TENSORFLOW library has a job description file. The inference job using the MXNET library has another job description file. However, content of job description files required for some combinations of a deep learning library type and a job type is the same and may be reused. Theoretically, if the deep learning job scheduling system wants to support a quantity of combinations of a deep learning library type and a job type, the same quantity of job basic images need to be created in this step. In other words, the quantity of job basic images may be a product of a quantity of deep learning library types and a quantity of job types. For example, the training job using the TENSORFLOW library has a job basic image. The inference job using the MXNET library has another job basic image. However, content of job basic images required for some combinations is the same and may be reused. The deep learning library type may include a plurality of deep learning libraries such as the TENSORFLOW and the MXNET. The job type may include a plurality of job types such as single-node training, distributed training, online prediction, and commissioning.

It may be understood that a deep learning job A is generated based on a job description file and a job basic image corresponding to the deep learning job A, and a deep learning job B is generated based on a job description file and a job basic image corresponding to the deep learning job B. "Specifications" of deep learning jobs generated based on different job description files and basic job images are the same. Therefore, a "specification" of the deep learning job A is the same as a "specification" of the deep learning job B. Herein, the "specification" refers to a feature, of the deep learning job, that can be accepted by the container scheduler. Therefore, although a deep learning library type and a job type of the deep learning job A are different from a deep learning library type and a job type of the deep learning job B, both the deep learning job A and the deep learning job B can be accepted by the container scheduler.

In a specific embodiment of this application, the storage system may be any type of storage system, including but not limited to a local file system, a network file system, a database system, an object storage system, and the like.

It should be noted that the job description file template and the job basic image are equivalent to two "models". If different "materials" are filled in the job description file template and the job basic image, deep learning jobs with different "materials" but a same "specification" may be generated. In this way, a plurality of deep learning libraries and a plurality of job types are uniformly abstracted and encapsulated such that the container scheduler can uniformly manage various deep learning jobs.

In the deep learning job scheduling system, a core component includes the job scheduler 302 and the job monitor 303. The following separately describes the job scheduler and job monitor in terms of structure.

Figure 8:
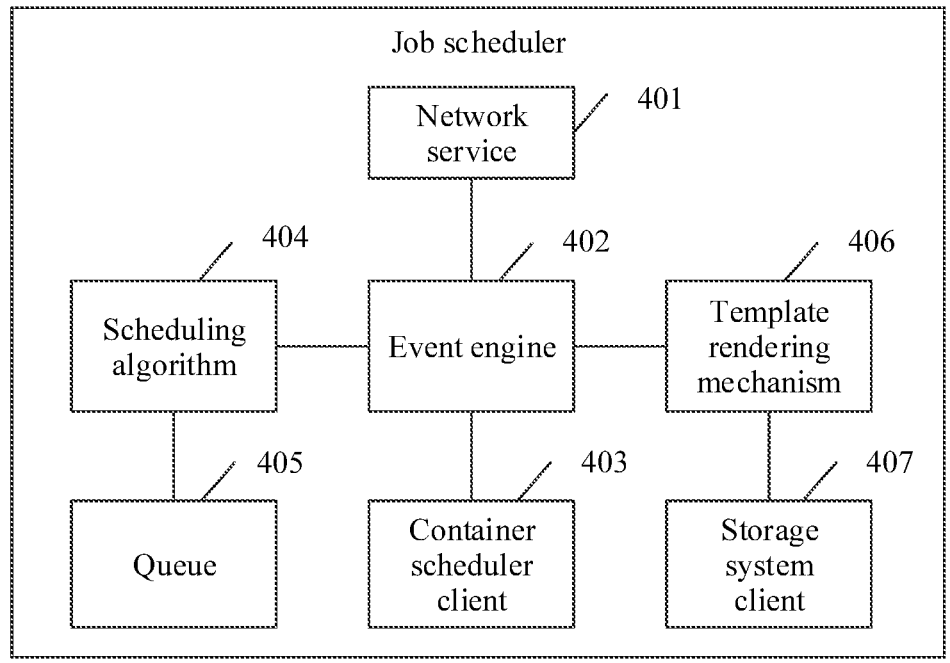
FIG. 8 is a schematic diagram of a structure of a job scheduler according to an implementation of this application.

The job scheduler is a component configured to schedule and execute a deep learning job, and includes a queue component configured to implement batch processing job scheduling. The job scheduler needs to use two types of files stored in the storage system the job description file template and the job basic image. The job scheduler needs to communicate with the container scheduler to create and manage a task container. The job scheduler also has a user interface program that matches the job scheduler, for the user to perform an operation. When the user submits a job to the job scheduler through the user interface program, an entity that carries information is the job request. When the job scheduler delivers a job to the container scheduler, an entity that carries information is the job description file. To implement a function of deep learning job scheduling, the job scheduler needs to have a reasonable internal structure design. A feasible internal structure design solution of the job scheduler is shown in FIG. 8. It should be noted that the internal structure design solution is merely used for description, and should not constitute a specific limitation.

In the internal structure design solution of the job scheduler shown in FIG. 8, the job scheduler mainly includes internal components such as a network service 401, an event engine 402, a container scheduler client 403, a scheduling algorithm 404, a queue 405, a template rendering mechanism 406, and a storage system client 407. The network service 401 is used to receive messages from a user interface program and a job monitor, for example, a job request submitted by a user through the user interface program, and job status information sent by the job monitor. The event engine 402 is configured to process various asynchronous events generated by the network service, and convert the events into function calls to another internal component, to drive overall orderly operation of the job scheduler. The container scheduler client 403 is configured to send a request to a container scheduler, to start a container and execute a job on a compute node. The scheduling algorithm 404 is used to implement algorithm logic of batch processing job scheduling, for example, a first in first out scheduling algorithm or a priority scheduling algorithm. The queue 405 is used to store a job request that has not been successfully scheduled. The template rendering mechanism 406 is used to generate, based on a job description file template and a job request, a job description file for use by the container scheduler client. The storage system client 407 is configured to access a storage system, to read metainformation such as the job description file template and a job basic image name. Optionally, the network service 401 is a remote procedure call (RPC) service, a client scheduler client 403 is a KUBERNETES client, a template rendering machine 406 is a Jinja language rendering mechanism, and the storage system client 407 is an network file system (NFS) client.

Figure 9:
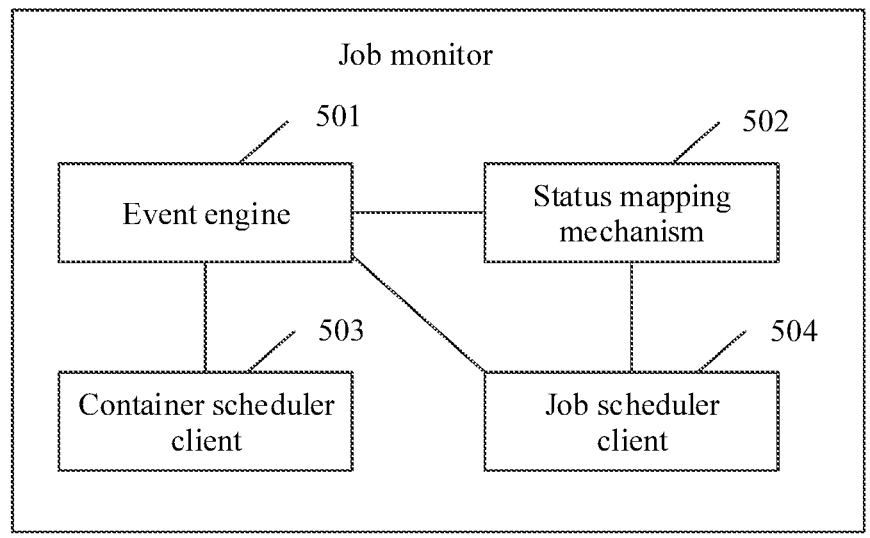
FIG. 9 is a schematic diagram of a structure of a job monitor according to an implementation of this application.

The job monitor is a component configured to perceive a running status of a deep learning job. The job monitor needs to communicate with the container scheduler, to obtain a running status of a task container. The job monitor also needs to communicate with the job scheduler, to feed back status information to the job scheduler. To implement a function of deep learning job monitoring, the job monitor needs to have a reasonable internal structure design. A feasible internal structure design solution of the job monitor is shown in FIG. 9. It should be noted that the internal structure design solution is merely used for description, and should not constitute a specific limitation.

In the internal structure design solution of the job monitor shown in FIG. 9, the job monitor mainly includes internal components such as an event engine 501, a status mapping mechanism 502, a container scheduler client 503, and a job scheduler client 504. The event engine 501 is configured to process various asynchronous events monitored by the container scheduler client, and convert the events into function calls to another internal component, to drive overall orderly operation of the job monitor. The status mapping mechanism 502 is used to map a status of all container sets of a job to an overall status of the job. The container scheduler client 503 is configured to send a request to a container scheduler, to start a container and execute the job on a compute node. The job scheduler client 504 is configured to communicate with a job scheduler, to feed back a change of the job status to the job scheduler. Optionally, a client scheduler client 503 is a KUBERNETES client, and the job scheduler client 504 is an RPC client.

It should be understood that division of the two components, the job scheduler and the job monitor, indicates only logical division of the components and does not impose a constraint on physical implementation. In the physical implementation, the two components may be implemented in different programs and run in different processes, or may be implemented in a same program and run in a same process, or may even be separately implemented in a distributed manner. In other words, the two components may be located in a plurality of programs and run in a plurality of processes.

The deep learning job scheduling system shown in FIG. 3 may be implemented on a server, or may be implemented on a cloud computing infrastructure. This is not specifically limited herein. The following focuses on how to implement the deep learning job scheduling system shown in FIG. 3 on the cloud computing infrastructure.

Figure 10:
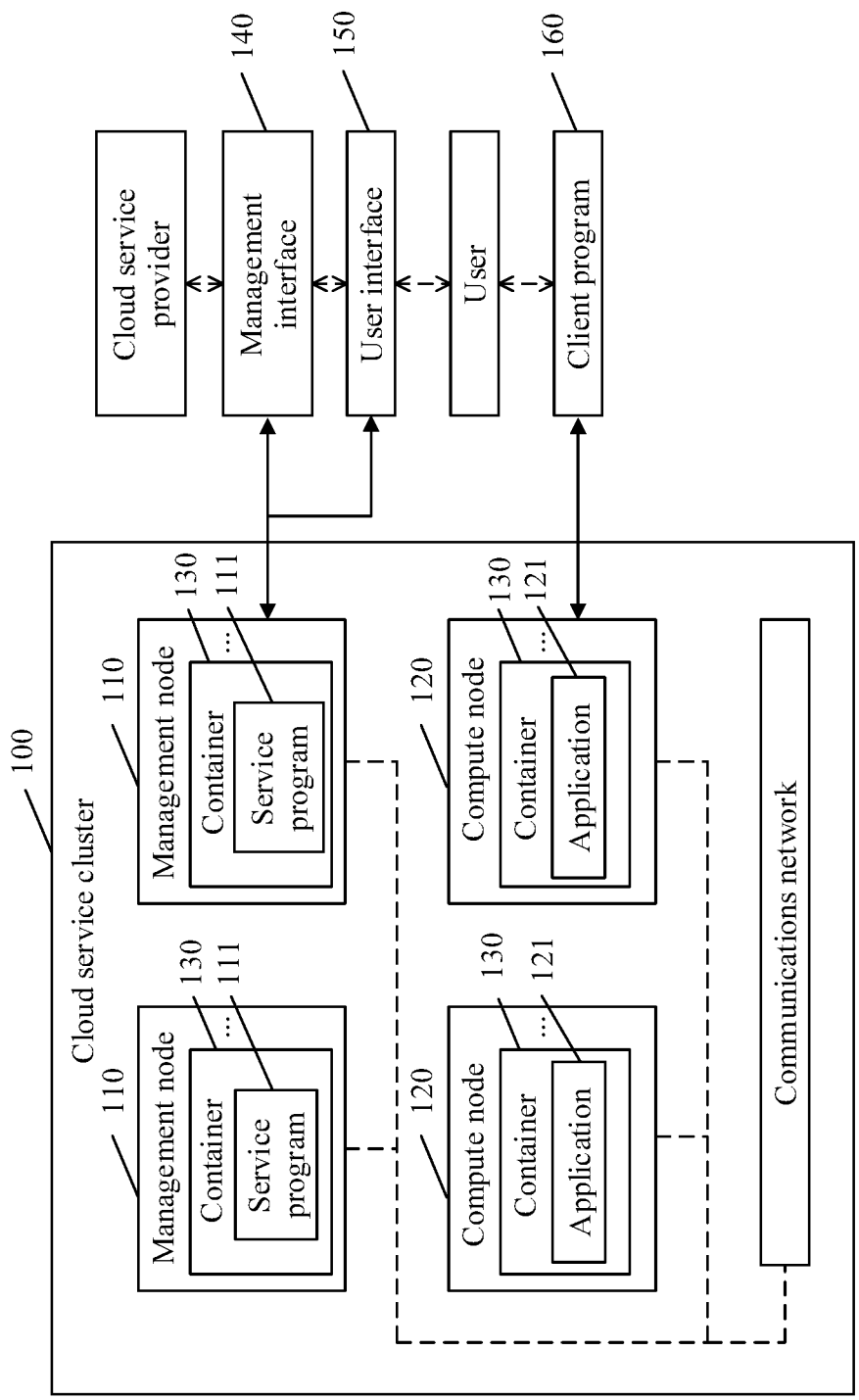
FIG. 10 is a schematic diagram of a structure of a cloud service cluster according to an implementation of this application.

The cloud computing infrastructure may be a cloud service cluster 100. As shown in FIG. 10, the cloud service cluster 100 includes nodes and a communications network between the nodes. The nodes may be classified into two types by function management nodes 110 and compute nodes 120. The management node 110 is configured to run service programs 110 of a cloud service provider. The compute node 120 is configured to run applications 121 of a user. The cloud service cluster 100 further provides two external interface pages a management interface 140 oriented to the cloud service provider and a user interface 150 oriented to the user. The nodes may be physical servers, or may be virtual machines. A form of the service program 111 or the application 121 on the nodes is a process. These processes may directly run on an operating system, or may be encapsulated using containers 130. The container is a virtualization technology. The technology enables a process to run in a relatively independent and isolated environment (including an independent file system, a namespace, a resource view, and the like), thereby simplifying a software deployment process, enhancing software portability and security, and improving system resource utilization. The interface pages may have various forms, such as a web interface, a command line tool, and a representational state transfer (REST) interface. It should be noted that, for a deep learning job such as an online inference job, the user may also use a client program 160 to access the application 121 on the compute node 120.

Figure 11:
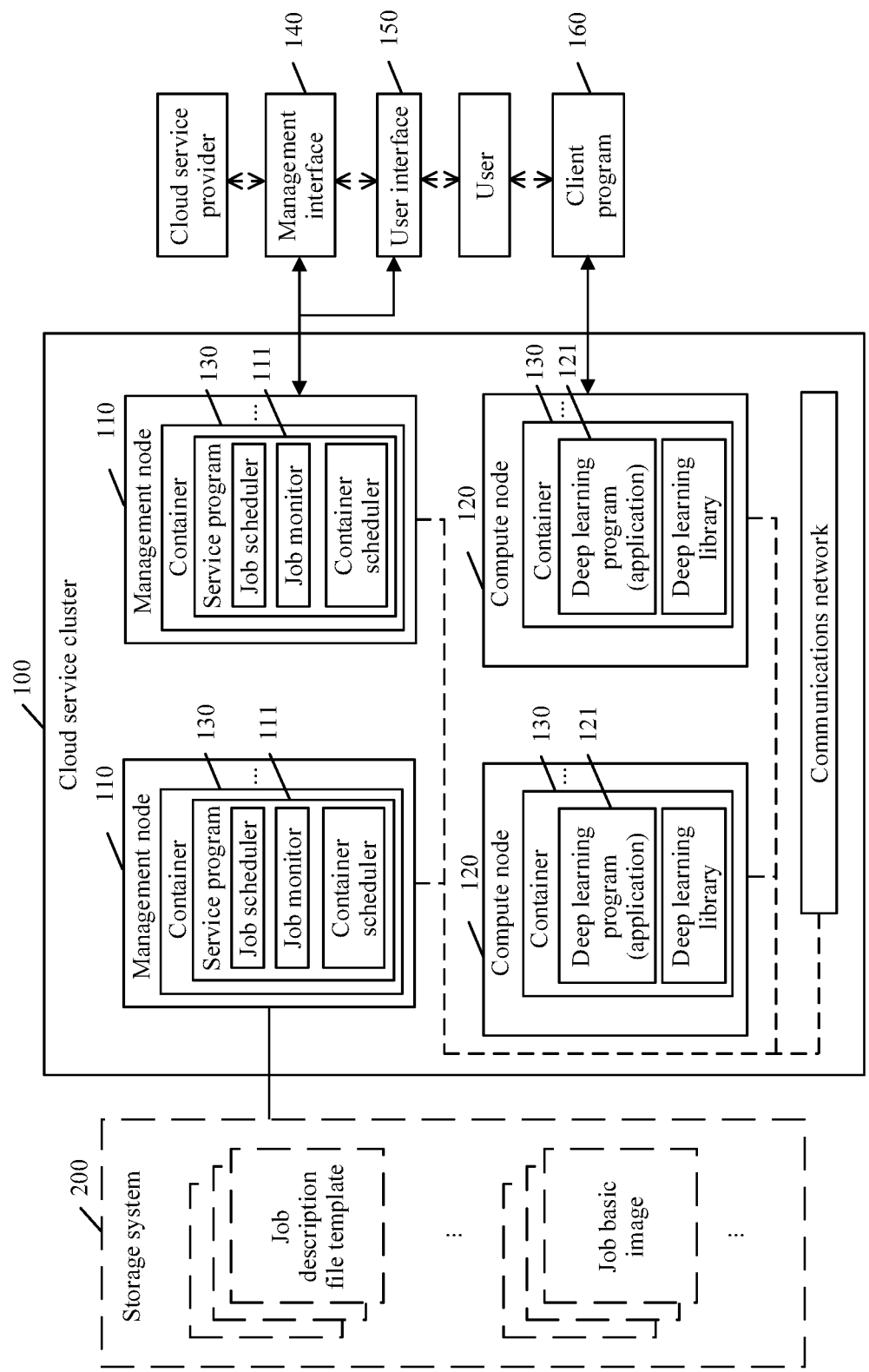
FIG. 11 is a schematic diagram of implementing a deep learning job scheduling system in a cloud service cluster according to this application.

When the deep learning job scheduling system shown in FIG. 3 is implemented using the cloud service cluster shown in FIG. 10, the cloud service cluster may be a cloud service cluster shown in FIG. 11. As shown in FIG. 11, the user interface 301 in FIG. 3 is a user interface 150 in FIG. 11, the job scheduler 302, the container scheduler 304, and the job monitor 306 in FIG. 3 are disposed in a service program 111 of a management node 110 in FIG. 11, the compute node 305 in FIG. 3 is a compute node 120 in FIG. 11, and the storage system 303 in FIG. 3 is a storage system 200 in FIG. 11. Optionally, the storage system 200 may be disposed outside the cloud service cluster, or may be integrated into the cloud service cluster. This is not specifically limited herein.

It should be understood that the cloud service cluster 100 is merely an example provided in the embodiments of this application. In addition, the cloud service cluster 100 may include more or fewer components than shown components, or may combine two or more components, or may have different component configurations.

Figure 12:
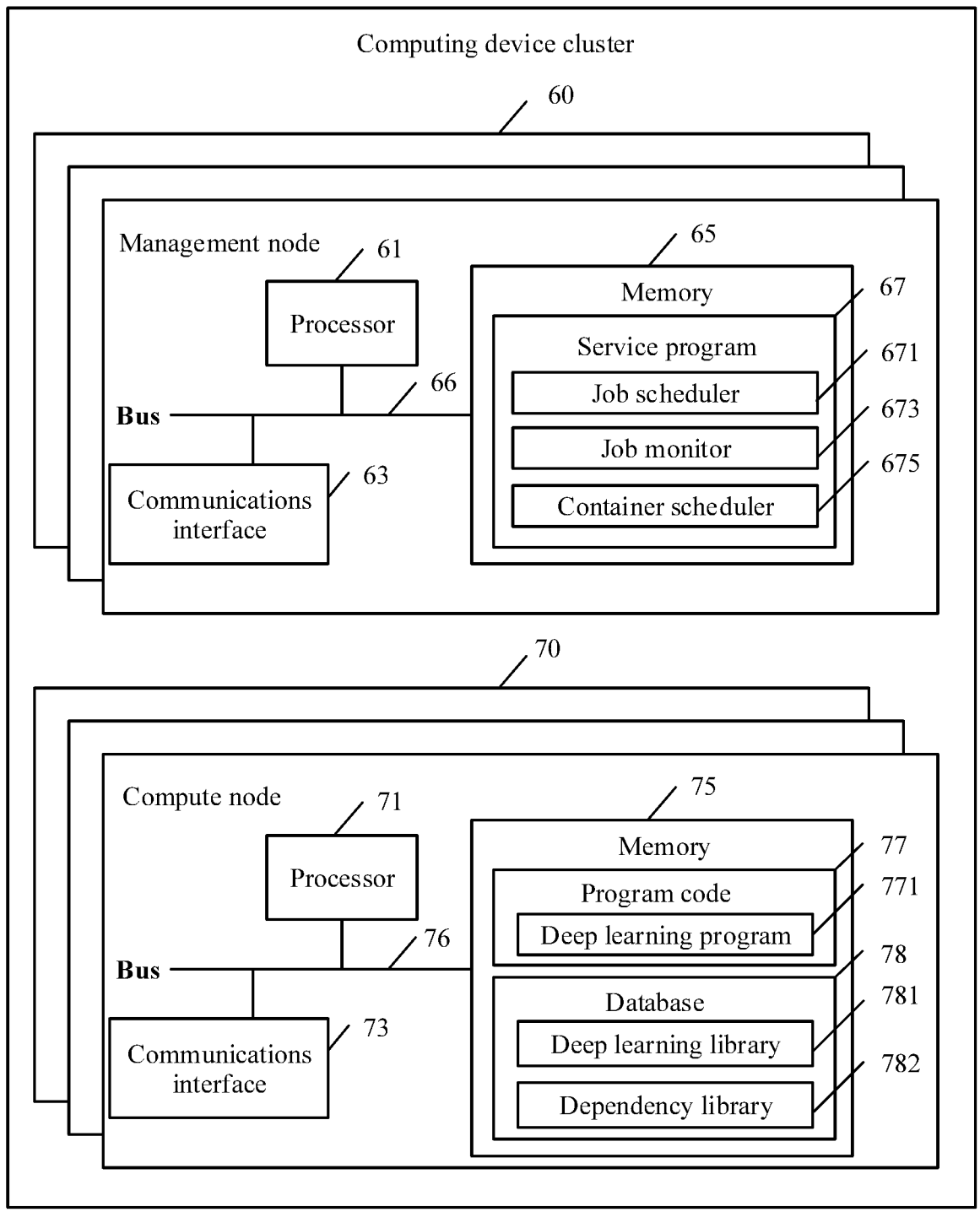
FIG. 12 is a schematic diagram of a structure of a deep learning job scheduling system according to an implementation of this application.

Refer to FIG. 12. FIG. 12 is a schematic diagram of a structure of a deep learning job scheduling system according to an implementation of this application. The system includes a computing device cluster. The computing device cluster includes at least one management node 60 and at least one compute node 70.

The management node 60 includes one or more processors 61, a communications interface 63, and a memory 65. The processor 61, the communications interface 63, and the memory 65 may be connected using a bus 66.

The processor 61 includes one or more general-purpose processors. The general-purpose processor may be any type of device that can process an electronic instruction, including a central processing unit (CPU), a microprocessor, a microcontroller, a main processor, a controller, an application specific integrated circuit (ASIC), and the like. The processor 61 can be a dedicated processor configured only for the management node 60 or can be shared with another management node 60 or the compute node 70. The processor 61 executes various types of digital storage instructions, for example, software or firmware programs stored in the memory 65 such that the processor 61 can enable the management node 60 to provide various relatively wide services. For example, the processor 61 can execute a program or process data, to execute at least a part of the method discussed in this specification.

The communications interface 63 may be a wired interface (for example, an Ethernet interface) or a wireless interface (for example, a cellular network interface or a wireless local area network interface), and is configured to communicate with another computing device or a user. When the communications interface 62 is a wired interface, the communications interface 62 may use a transfer control protocol (TCP)/Internet protocol (IP) protocol suite, such as an RAAS protocol, a Remote Function Call (RFC) protocol, a Simple Object Access Protocol (SOAP), a Simple Network Management Protocol (SNMP), a Common Object Request Broker Architecture (CORBA) protocol, and a distributed protocol. When the communications interface 62 is a wireless interface, cellular communication may be used according to a Global System for Mobile Communications (GSM) or code-division multiple access (CDMA) standard. Therefore, the communications interface 62 includes a wireless modem, an electronic processing device, one or more digital memory devices, and a dual antenna that are used for data transmission. It should be understood that the modem can be implemented as software stored in the management node and executed by the processor 61, or the modem can be a separate hardware component located inside or outside the management node 60. The modem can operate with any quantity of different standards or protocols (for example, Evolution-Data Optimized (EVDO) (CDMA2000 1×EV-DO, EVDO), CDMA, a general packet radio service (GPRS) technology, and an enhanced data rates GSM evolution (EDGE) technology).

The memory 65 may include a volatile memory, for example, a random-access memory (RAM). Alternatively, the memory may include a non-volatile memory, for example, a read-only memory (ROM), a flash memory, a hard disk drive (HDD), or a solid-state drive (SSD). Alternatively, the memory may include a combination of the foregoing types of memories. The memory 65 may store a service program 67, used to provide a service for the compute node 70. The service program 67 may include a job scheduler 671, a job monitor 673, and a container scheduler 675. The job scheduler 671 is a component configured to schedule and execute a deep learning job, and includes a queue component configured to implement batch processing job scheduling. The job monitor 673 is a component configured to perceive a running status of the deep learning job. The job monitor 673 needs to communicate with the container scheduler 675 to learn a running status of a task container. The job monitor 673 further needs to communicate with the job scheduler 671 to feed back status information to the job scheduler 671. The container scheduler 675 is configured to, based on a request of the job scheduler 671 and the job monitor 673, start a container and execute a job on the compute node 70. In a specific implementation, for a specific implementation of the job scheduler 671, refer to FIG. 8 and related descriptions. Details are not described herein again. In a specific implementation, for a specific implementation of the job monitor 673, refer to FIG. 9 and related descriptions. Details are not described herein again.

The compute node 70 includes one or more processors 71, a communications interface 73, and a memory 75. The processor 71, the communications interface 73, and the memory 75 may be connected using a bus 76.

The processor 71 includes one or more general-purpose processors. The general-purpose processor may be any type of device that can process an electronic instruction, including a CPU, a microprocessor, a microcontroller, a main processor, a controller, an ASIC, and the like. The processor 71 can be a dedicated processor configured only for the compute node 70 or can be shared with the management node 60 or another compute node 70. The processor 71 executes various types of digital storage instructions, for example, software or firmware programs stored in the memory 75 such that the processor 71 can enable the compute node 70 to provide various relatively wide services. For example, the processor 71 can execute a program or process data, to execute at least a part of the method discussed in this specification.

The communications interface 72 may be a wired interface (for example, an Ethernet interface) or a wireless interface (for example, a cellular network interface or a wireless local area network interface), and is configured to communicate with another computing device or a user. When the communications interface 72 is a wired interface, the communications interface 72 may use a TCP/IP protocol suite, such as, an RAAS protocol, an RFC protocol, a SOAP protocol, an SNMP protocol, a CORBA protocol, and a distributed protocol. When the communications interface 72 is a wireless interface, cellular communication may be used according to a GSM or CDMA standard. Therefore, the communications interface 72 includes a wireless modem, an electronic processing device, one or more digital memory devices, and a dual antenna that are used for data transmission. It should be understood that the modem can be implemented as software stored in the management node and executed by the processor 71, or the modem can be a separate hardware component located inside or outside the compute node 70. The modem can operate with any quantity of different standards or protocols.

The memory 75 may include a volatile memory, for example, a RAM. Alternatively, the memory may include a non-volatile memory, for example, a ROM, a flash memory, an HDD, or an SSD. Alternatively, the memory may include a combination of the foregoing types of memories. The memory 75 may store program code 77 and a database 78. The program code 77 may include a deep learning program 771. The database 78 may include a deep learning library 781 and a dependency library 782. The deep learning program 771 is software, developed by the user, that is about a deep learning computing service. An instantiation of the deep learning program is a deep learning job. A computing service mainly applicable to a deep learning application scenario includes training, inference, commissioning, visualization, and the like. Therefore, a job type of the deep learning job includes a training job, an inference job, a commissioning job, a visualization job, and the like. The deep learning library 781 is a computer function library designed for development of the deep learning program, and is a computer program file including elements such as a data structure, an algorithm, a model, a subprogram, and a constant that are commonly used in the deep learning program, or a set of computer program files. In other words, the deep learning library is application software encapsulated with a bottom-layer operation of the deep learning job. Therefore, when developing deep learning programs for various deep learning application scenarios using the deep learning library, the user may focus on content related to the deep learning application scenarios, and does not need to pay too much attention to content of the bottom-layer operation. This greatly improves development efficiency. The deep learning library may include a TENSORFLOW, an MXNET, and the like. It should be understood that the foregoing examples are merely used for description, and should not constitute a specific limitation. The dependency library 782 is a database required when the deep learning job is run.

It should be noted that a job description file template and a job basic image may be stored in some management nodes 60 and/or some compute nodes 70 in the computing device cluster. In other words, the storage system 200 may include storage resources inside the management node 60 and/or the compute node 70. For example, the storage system 200 is a distributed storage pool. Alternatively, the job description file template and the job basic image may be stored outside the management node 60 and the compute node 70. In other words, the storage system 200 does not include the storage resources inside the management node 60 and/or the compute node 70.

The management node 60 is configured to run the program stored in the memory 65, to execute the following instructions obtaining a job request of the deep learning job, where the job request carries a deep learning library type and a job type, determining a target job description file template from a plurality of pre-stored job description file templates based on the deep learning library type and the job type, determining an identifier of a target job basic image from identifiers of a plurality of pre-stored job basic images based on the deep learning library type and the job type, generating a target job description file based on the target job description file template and the identifier of the target job basic image, sending the target job description file to a container scheduler, and selecting the target job basic image from the pre-stored job basic images based on the target job description file, and creating at least one container on the at least one compute node 70 for executing the job request.

Optionally, the deep learning job includes at least one task.

The job request further includes at least one piece of the following information a job name, a deep learning program storage location, an application boot file, a dataset storage location, a type of the at least one task, a quantity of each type of task in the at least one task, a job command line parameter, and a resource requirement of each of the at least one task.

Alternatively, the job request further includes at least one piece of the following information a job name, a deep learning program, an application boot file, a dataset storage location, a type of the at least one task, a quantity of each type of task in the at least one task, a job command line parameter, and a resource requirement of each of the at least one task.

The management node 60 is further configured to generate the target job description file based on the job request, the target job description file template, and the identifier of the target job basic image.

Optionally, the management node 60 is further configured to fill the target job description file template with the information included in the job request and the identifier of the target job basic image, to obtain the target job description file.

Optionally, the job basic images include an image of a deep learning library and an image of a dependency library, and the basic job images do not include an image of the deep learning program.

Alternatively, the job basic images include an image of a deep learning library, an image of a dependency library, and an image of the deep learning program.

The dependency library is a library required when the deep learning job is executed, and an instantiation of the deep learning program is the deep learning job.

Optionally, the plurality of pre-stored job description file templates are generated based on deep learning library types and job types, and each of the plurality of pre-stored job description file templates corresponds to one deep learning library type and one job type.

The plurality of pre-stored job basic images are generated based on the deep learning library types and the job types, and each of the plurality of pre-stored job basic images corresponds to one deep learning library type and one job type.

Optionally, the management node 60 is further configured to when the container scheduler fails in scheduling, store, in a queue, a job identifier indicating the job request. The job identifier includes at least one of the job request, the information included in the job request, the target job description file, a pointer, and a data structure. The pointer points to at least one of the job request, the information carried in the job request, and the target job description file. The data structure points to at least one of the job request, the information carried in the job request, and the target job description file.

Optionally, the management node 60 is further configured to determine that the container scheduler has a condition for resubmitting a job request, and extract the job identifier from the queue and resubmit the job request to the container scheduler based on the job identifier.

For brevity, the cloud service cluster shown in FIG. 11 and the computing device cluster shown in FIG. 12 are not described in detail. For details, refer to FIG. 3 and related descriptions.

Figure 13:
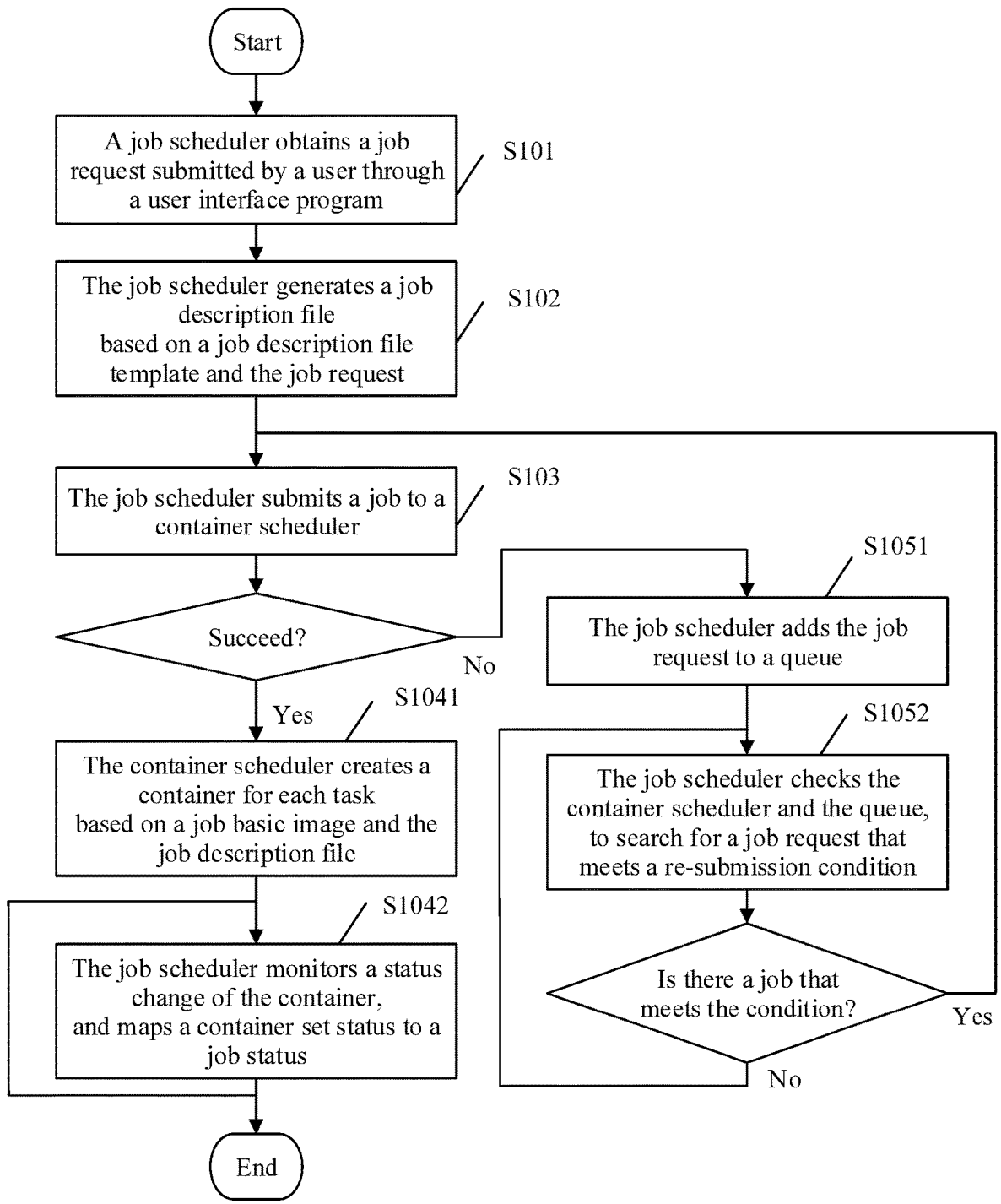
FIG. 13 is a schematic diagram of a deep learning job scheduling method according to this application.

Refer to FIG. 13. FIG. 13 is a schematic diagram of a deep learning job scheduling method according to this application. The deep learning job scheduling method in this embodiment of this application includes the following steps.

S101 A job scheduler obtains a job request submitted by a user through a user interface program.

In a specific embodiment of this application, when the user submits a job, the user needs to notify the user interface program of description information (including but not limited to information such as an application, a command parameter, and a resource requirement) of the job, and the user interface program transfers the information to the job scheduler, to implement a submission process of the job request.

S102 The job scheduler generates a job description file based on a job basic image name, a job description file template, and the job request.

In a specific embodiment of this application, the job scheduler loads a corresponding job description file template and a corresponding job basic image name from a storage system based on a deep learning library type and a job type that are specified in the job request. Then, through template rendering or a filling mechanism, the job description file is created using the job basic image name and information in the job request as input of the job description file template.

S103 The job scheduler submits the job to a container scheduler.

In a specific embodiment of this application, the job scheduler calls an interface of the container scheduler to transfer the job description file to the container scheduler in order to request the container scheduler to create and run a container corresponding to each task of the deep learning job. If the container scheduler successfully receives the request, step S1041 is performed. If the container scheduler fails to receive the request, step S1051 is performed. The container scheduler may fail to receive the job request due to insufficient hardware resources or an occasional network fault.

S1041 The container scheduler creates the container for each task based on a job basic image and the job description file.

In a specific embodiment of this application, the container scheduler loads a corresponding job basic image from the storage system based on the deep learning library type and the job type that are specified in the job description file. Then, based on a task specification specified in the job description file, a basic image is used to create a corresponding quantity of containers. In addition, a process of the task is run in the container based on the application, the command parameter, and other information specified in the job description file. The resource requirement information specified in the job description file is used by the container scheduler to select a host environment (namely, a compute node) for running the container.

S1042 The job scheduler monitors a status change of the container, and maps a container set status to a job status.

In a specific embodiment of this application, the job monitor monitors, in real time through the interface of the container scheduler, running statuses of containers corresponding to all tasks of the deep learning job, and perceives a change of the statuses. When a status of a container changes, the job monitor obtains an overall status of the deep learning job through a status mapping mechanism. The status may be fed back to the job scheduler and may be queried by the user through a user interface. As the status of the container changes, this step may be repeated for a plurality of times until the job is complete.

S1051 The job scheduler adds the job request to a queue.

In a specific embodiment of this application, a queue in the job scheduler is used to store a job request that fails in the submission process. It should be noted that the job scheduler storing the job request is merely an example. In actual application, the job scheduler may further store another identifier of the deep learning job, for example, the information in the job request submitted by the user interface program, the job description file generated by the job scheduler, a pointer or another data structure to these objects, or the like.

S1052 The job scheduler checks the container scheduler and the queue, to search for a job request that meets a re-submission condition.

In a specific embodiment of this application, the job scheduler calls the interface of the container scheduler to check whether the container scheduler has a condition for accepting submission of a new job. Then, the job scheduler reads the queue of the job scheduler, to check whether there is a job request that failed to be submitted. If the container scheduler meets the condition, and there is such a job request in the queue, the job scheduler extracts, from the queue based on a job selection logic, the job request that meets the re-submission condition, and the step S103 is performed again to submit the job to the container scheduler. If the container scheduler does not meet the condition, and there is no such a job request in the queue, this step is repeated to continue checking a status of the container scheduler and a status of the queue.

For brevity, for definitions of the job description file, the job request, the job description file template, and the job basic image name, and relationships between the job description file, the job request, the job description file template, and the job basic image name, refer to the foregoing embodiment. Details are not described herein again.

Figure 14:
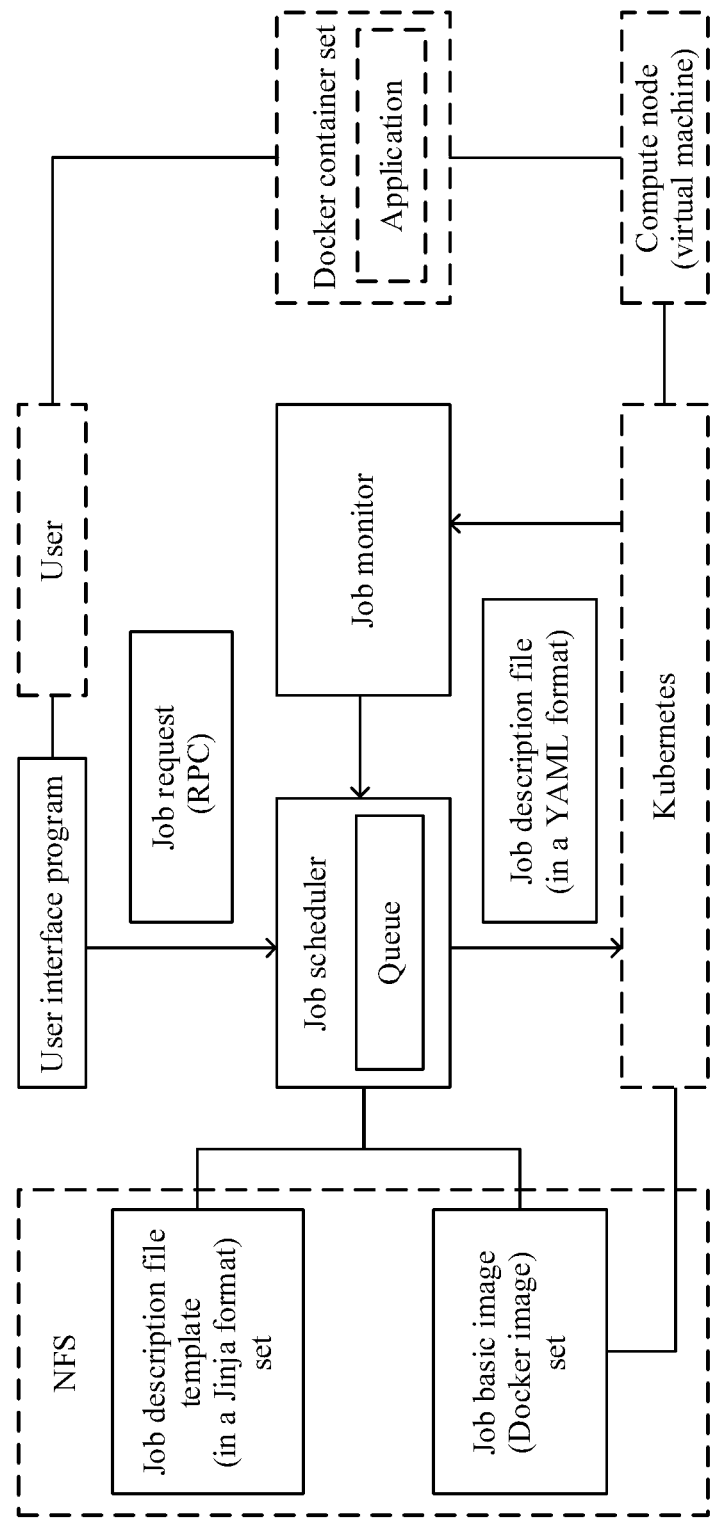
FIG. 14 is a schematic diagram of implementing, through KUBERNETES, a deep learning job scheduling system shown in FIG. 3 according to an implementation of this application.

The following uses open-source container orchestration software—KUBERNETES as an example to describe the deep learning job scheduling method provided in the embodiments of this application. As shown in FIG. 14, when the open-source container orchestration software—KUBERNETES is used, components in the deep learning job scheduling system in this application have the following features.

In this embodiment, a user interface program is a web application, and a user needs to operate the user interface program using a web browser. In this embodiment, a job request sent by the user interface program to a job scheduler is an RPC message.

In this embodiment, the job scheduler and a job monitor are two independent computer programs that run on a management node in a public cloud service environment. The job scheduler communicates with the job monitor through a RPC protocol, because this protocol has advantages of cross-platform and cross-language and facilitates construction of a distributed cloud service environment. A queue of the job scheduler is implemented as a queue data structure in a programming language, and a pointer to the job request is stored in the queue.

In this embodiment, a Docker container is used as a task container, and a Docker image is used as a job basic image. The KUBERNETES uses open-source container management software Docker as platform software for creating and managing a container. Therefore, in this embodiment, the Docker container is used as the task container, and the Docker image is used as the job basic image. The Docker container is run on a compute node. A plurality of containers may be run on one compute node. An application corresponding to a user job runs in the Docker container. The user may access a resource in the container through application code or an interface provided by the application.

In this embodiment, a format of a job description file is a YAML Ain't Markup Language (YAML) format. The KUBERNETES accepts the YAML format. Therefore, the job description file in this embodiment uses the YAML format. The job scheduler submits the job description file to the KUBERNETES through a REST application programming interface (API) of the KUBERNETES. In this embodiment, a Jinja format is selected as a format of a job description file template, because a file in the Jinja format can be rendered by a corresponding compiler, with simple syntax, to generate a text configuration file including YAML.

In this embodiment, a storage system is a NFS. The storage system stores the job description file template and the job basic image, because the NFS has single storage space that can be globally accessed in a distributed system, and facilitates technical implementation of the scheduling system. When reading the two types of files, the job scheduler directly uses a file system interface. The KUBERNETES also reads the job basic image through the file system interface to create a container based on the image.

In this embodiment, the job scheduler and the job monitor are two independent computer programs that run on the management node in the public cloud service environment. The job scheduler communicates with the job monitor through the RPC protocol, because this protocol has the advantages of cross-platform and cross-language and facilitates construction of the distributed cloud service environment. The queue of the job scheduler is implemented as the queue data structure in the programming language, and the pointer to the job request is stored in the queue.

When the open-source container orchestration software—KUBERNETES is used, the deep learning job scheduling method shown in FIG. 13 may be specifically as follows S101 A job scheduler obtains a job request submitted by a user through a user interface program.

In a specific embodiment of this application, the user needs to use a web browser to access a web service-based user interface program. When submitting a job, information that the user needs to provide includes a job name, a deep learning library type, a job type, an application storage location, a dataset storage location, a task type and quantity, a resource requirement of each task, and the like. The user interface program encodes the information, generates a job request in an RPC format, and sends the job request to the job scheduler. In this way, the job scheduler obtains the job request of the user.

In this embodiment, the job name (job_name), the application storage location (app_url and boot_file), and the dataset storage location (data_url) are string fields, the deep learning library type (engine_type) and the job type (job_type) are enumerated fields, the task type and quantity (scale_description) and the resource requirement (attribute_description) of each task are key-value pair fields.

S102 The job scheduler generates a job description file based on a job basic image name, a job description file template, and the job request.

In a specific embodiment of this application, the job scheduler loads a corresponding job description file template from an NFS based on a deep learning library type and a job type that are specified in a job request RPC message. Then, the job scheduler calls a built-in Jinja template rendering mechanism, and uses information in the job request as an input variable during rendering, to create a job description file in a YAML format. The job description file generated by the job scheduler may be parsed by the KUBERNETES to create a task container.

S103 The job scheduler submits the job to a container scheduler.

In a specific embodiment of this application, the job scheduler calls a REST API of the KUBERNETES to transfer the job description file in the YAML format to the KUBERNETES in order to request the KUBERNETES to create and run a container corresponding to each task of the job. If the KUBERNETES successfully receives the request, step S1041 is performed. If the KUBERNETES fails to receive the request, step S1051 is performed. The KUBERNETES may fail to receive the job request due to insufficient hardware resources or an occasional network fault.

S1041 The container scheduler creates the container for each task based on a job basic image and the job description file.

In a specific embodiment of this application, the KUBERNETES loads a corresponding job basic image from the NFS based on the deep learning library type and the job type that are specified in the job description file. In this embodiment, the loaded job basic image is a TENSORFLOW image. Then, the KUBERNETES uses the job basic image to create a corresponding quantity of Pod objects and Service objects based on a task specification (namely, a total number of Pods running PS and worker tasks) specified in the job description file. In this way, each Pod corresponds to one container, and each Service corresponds to one network port. Next, a process of each task is run in the container based on an application, a command parameter, and other information specified in the job description file. A TENSORFLOW distributed training job is used as an example. These processes include one PS task process and two worker task processes of the TENSORFLOW distributed training job. Application code required to start a task process is specified by a command field in the job description file. In this embodiment, a run_train.sh program specified by the command field is used to start a TENSORFLOW training task. The program first downloads an application code directory specified by the app_url field in the job request, and then executes an application specified by the boot_file field. Command parameters of the process are also from the job description file, and main parameters include a task_index parameter used to specify a task sequence number and a data_url parameter used to specify the dataset storage location.

The resource requirement information specified in the job description file is used by the KUBERNETES to select a host environment (namely, a compute node) for running the container. For example, each Pod (namely, a container) declares that 7.2 gigabytes (GiB) of memory and four CPU cores are required. Therefore, the KUBERNETES searches for a compute node with more idle resources than declared resources. Each container may be run on a same compute node, or may be run on different compute nodes.

S1042 The job scheduler monitors a status change of the container, and maps a container set status to a job status.

In a specific embodiment of this application, the job monitor monitors, in real time through a Watch interface of the KUBERNETES, running statuses of containers corresponding to all tasks of the job, and perceives a change of the statuses. When a status of a container changes, the job monitor obtains a latest status of the container in real time through an event stream read from the Watch interface. Then, the job monitor obtains an overall status of the job through a built-in status mapping mechanism. Finally, the job monitor calls an RPC interface provided by the job scheduler to feed back the status to the job scheduler. The user may query the job status through the user interface program. As the status of the container changes, this step may be repeated for a plurality of times until the job is complete.

In this embodiment, main mapping rules of the status mapping mechanism include a) If all the containers enter a running state, it is considered that the job enters a running state, b) If all worker task containers enter a complete state, it is considered that the job enters a complete state, c) If one or more containers enter a failed state, it is considered that the job enters a failed state.

S1051 The job scheduler adds the job request to a queue.

In a specific embodiment of this application, a queue in the job scheduler is used to store a job request that fails in a submission process. In this embodiment, the queue of the job scheduler is implemented as a queue data structure in a programming language, and a pointer to the job request is stored in the queue. Therefore, adding a failed job request to the queue is actually adding, to the queue, a pointer to the job request.

S1052 The job scheduler checks the container scheduler and the queue, to search for a job request that meets a re-submission condition.

In a specific embodiment of this application, the job scheduler calls an interface of the KUBERNETES to check whether the KUBERNETES has a condition for accepting submission of a new job. In this embodiment, the condition mainly means that a compute node has sufficient resources. Then, the job scheduler reads the queue of the job scheduler, to check whether there is a job request that failed to be submitted. If resources on the compute node managed by the KUBERNETES meets the condition, and there is such a job request in the queue of the job scheduler, the job scheduler extracts, from the queue based on a job selection logic, the job request that meets the re-submission condition, and the step S103 is performed again to submit the job to the KUBERNETES. Otherwise, this step is repeated to continue checking a status of the KUBERNETES and a status of the queue. In this embodiment, the job selection logic uses a simple "first in first out (FIFO)" rule. To be specific, a job request with earliest enqueue time is selected from the queue.

In the foregoing technical solutions, different types of deep learning jobs may generate, based on different job description file templates and different job basic images, job description files that comply with a specification of the container scheduler such that the different types of deep learning jobs can be processed by the container scheduler. This improves compatibility of deep learning job scheduling.

All or some of the foregoing embodiments may be implemented using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a storage disk, or a magnetic tape), an optical medium (for example, a digital versatile disc (DVD)), a semiconductor medium (for example, a SSD), or the like.

What is claimed is:

1. A deep learning job scheduling method, comprising:
    obtaining a job request of a deep learning job comprising a deep learning library type and a job type;
    determining a target job description file template from a plurality of pre-stored job description file templates based on the deep learning library type and the job type;
    determining an identifier of a target job basic image from identifiers of a plurality of pre-stored job basic images based on the deep learning library type and the job type, wherein the pre-stored job basic images comprise an image of a deep learning library, an image of a dependency library, and an image of a deep learning program;
    generating a target job description file based on the target job description file template and the identifier;
    sending the target job description file to a container scheduler;
    selecting, by the container scheduler, the target job basic image from the pre-stored job basic images based on the target job description file; and
    creating a container for executing the job request.

2. The deep learning job scheduling method of claim 1, wherein the deep learning job comprises a task, wherein the job request further comprises one of the following two options: (1) at least one of a job name, a deep learning program storage location, an application boot file, a dataset storage location, a type of the task, a quantity of the task, a job command line parameter, or a resource requirement of the task, or (2) at least one of the job name, the deep learning program, the application boot file, the dataset storage location, the type, the quantity, the job command line parameter, or the resource requirement, and wherein the deep learning scheduling method further comprises generating the target job description file based on the job request, the target job description file template, and the identifier.

3. The deep learning job scheduling method of claim 2, further comprising filling the target job description file template with information comprised in the job request and the identifier to obtain the target job description file.

4. The deep learning job scheduling method of claim 1, wherein the dependency library is used when the deep learning job is executed, and wherein an instantiation of the deep learning program is the deep learning job.

5. The deep learning job scheduling method of claim 1, wherein the pre-stored job description file templates is based on deep learning library types and job types, wherein each of the pre-stored job description file templates corresponds to one deep learning library type and one job type, wherein the pre-stored job basic images are based on the deep learning library types and the job types, and wherein each of the pre-stored job basic images corresponds to one deep learning library type and one job type.

6. The deep learning job scheduling method of claim 1, wherein after sending the target job description file to the container scheduler, the deep learning job scheduling method further comprises storing a job identifier indicating the job request in a queue when the container scheduler fails in scheduling, wherein the job identifier comprises at least one of the job request, information comprised in the job request, the target job description file, a pointer, or a data structure, wherein the pointer points to at least one of the job request, the information comprised in the job request, and the target job description file, and wherein the data structure points to at least one of the job request, the information carried in the job request, and the target job description file.

7. The deep learning job scheduling method of claim 6, wherein after storing the job identifier, the deep learning job scheduling method further comprises:
    determining that the container scheduler has a condition for resubmitting a job request;
    extracting the job identifier from the queue; and
    resubmitting the job request to the container scheduler based on the job identifier.

8. A deep learning job scheduling system, comprising:
    one or more processors;
    a memory coupled to the one or more processors and configured to store instructions that, when executed by the one or more processors, cause a job scheduler to:
        obtain a job request of a deep learning job comprising a deep learning library type and a job type;
        determine a target job description file template from a plurality of pre-stored job description file templates based on the deep learning library type and the job type;
        determine an identifier of a target job basic image from identifiers of a plurality of pre-stored job basic images based on the deep learning library type and the job type, wherein the pre-stored job basic images comprise an image of a deep learning library, an image of a dependency library, and an image of a deep learning program;
generate a target job description file based on the target job description file template and the identifier; and
send the target job description file; and
a container scheduler coupled to the job scheduler and configured to:
receive the target job description file from the job scheduler;
select the target job basic image from the pre-stored job basic images based on the target job description file; and
create at least one container for executing the job request.

9. The deep learning job scheduling system of claim 8, wherein the deep learning job comprises a task, wherein the job request further comprises one of the following two options: (1) at least one of a job name, a deep learning program storage location, an application boot file, a dataset storage location, a type of the task, a quantity of the task, a job command line parameter, and a resource requirement of the task, or (2) at least one of the job name, the deep learning program, the application boot file, the dataset storage location, the type of the task, the quantity of the task, the job command line parameter, and the resource requirement, and wherein the job scheduler is further configured to generate the target job description file based on the job request, the target job description file template, and the identifier.

10. The deep learning job scheduling system of claim 9, wherein the one or more processors are further configured to execute the instructions to cause the job scheduler is to fill the target job description file template with information comprised in the job request and the identifier to obtain the target job description file.

11. The deep learning job scheduling system of claim 8, wherein the dependency library is used when the deep learning job is executed, and wherein an instantiation of the deep learning program is the deep learning job.

12. The deep learning job scheduling system of claim 8, wherein the plurality of pre-stored job description file templates is based on deep learning library types and job types, wherein each of the pre-stored job description file templates corresponds to one deep learning library type and one job type, wherein the pre-stored job basic images are based on the deep learning library types and the job types, and wherein each of the pre-stored job basic images corresponds to one deep learning library type and one job type.

13. The deep learning job scheduling system of claim 8, wherein the container scheduler is further configured to store a job identifier indicating the job request in a queue in response to the container scheduler fails in scheduling, wherein the job identifier comprises at least one of the job request, information comprised in the job request, the target job description file, a pointer, and a data structure, wherein the pointer points to at least one of the following the job request, the information comprised in the job request, and the target job description file, and wherein the data structure points to at least one of the following the job request, the information carried in the job request, and the target job description file.

14. The deep learning job scheduling system of claim 13, wherein the one or more processors are further configured to execute the instructions to cause the job scheduler to:
determine that the container scheduler has a condition for resubmitting a job request;
extract the job identifier from the queue; and
resubmit the job request to the container scheduler based on the job identifier.

15. A cloud service cluster, comprising:
at least one compute node; and
at least one management node communicatively coupled to the compute node and configured to:
obtain a job request of a deep learning job comprising a deep learning library type and a job type;
determine a target job description file template from a plurality of pre-stored job description file templates based on the deep learning library type and the job type;
determine an identifier of a target job basic image from identifiers of a plurality of pre-stored job basic images based on the deep learning library type and the job type, wherein the pre-stored job basic images comprise an image of a deep learning library, an image of a dependency library, and an image of a deep learning program;
generate a target job description file based on the target job description file template and the identifier;
send the target job description file to a container scheduler;
select the target job basic image from the pre-stored job basic images based on the target job description file; and
create at least one container in the compute node for executing the job request.

16. The cloud service cluster of claim 15, wherein the deep learning job comprises a task, wherein the job request further comprises one of the following two options: (1) a job name, a deep learning program storage location, an application boot file, a dataset storage location, a type of the task, a quantity of the at task, a job command line parameter, and a resource requirement of the task, or (2) the job name, the deep learning program, the application boot file, the dataset storage location, the type of the task, the quantity of the task, the job command line parameter, and the resource requirement, and wherein the management node is further configured to generate the target job description file based on the job request, the target job description file template, and the identifier.

17. The cloud service cluster of claim 16, wherein the management node is further configured to fill the target job description file template with information comprised in the job request and the identifier to obtain the target job description file.

18. The cloud service cluster of claim 15, wherein the dependency library is used when the deep learning job is executed, and wherein an instantiation of the deep learning program is the deep learning job.

19. The cloud service cluster of claim 15, wherein the plurality of pre-stored job description file templates is based on deep learning library types and job types, wherein each of the pre-stored job description file templates corresponds to one deep learning library type and one job type, wherein the pre-stored job basic images are based on the deep learning library types and the job types, and wherein each of the pre-stored job basic images corresponds to one deep learning library type and one job type.

20. The cloud service cluster of claim 15, wherein the management node is further configured to store a job identifier indicating the job request in the queue in response to the container scheduler fails in scheduling, wherein the job identifier comprises at least one of the job request, information comprised in the job request, the target job description file, a pointer, and a data structure, wherein the pointer points to at least one of the following the job request, the information comprised in the job request, and the target job description file, and wherein the data structure points to at least one of the following the job request, the information carried in the job request, and the target job description file.

* * * * *

UNITED STATES PATENT AND TRADEMARK OFFICE
CERTIFICATE OF CORRECTION

PATENT NO. : 11,954,521 B2
APPLICATION NO. : 17/038720
DATED : April 9, 2024
INVENTOR(S) : Jian Lin, Jie Yang and Sibao Hong Page 1 of 1

It is certified that error appears in the above-identified patent and that said Letters Patent is hereby corrected as shown below:

On the Title Page

Page 2, (56) References Cited, Foreign Patents: "IN 107733977 A 2/2018" should read "CN 107733977 A 2/2018"

Signed and Sealed this
Twenty-first Day of May, 2024

Katherine Kelly Vidal
*Director of the United States Patent and Trademark Office*